United States Patent
Gunnalan et al.

(10) Patent No.: US 10,693,919 B2
(45) Date of Patent: *Jun. 23, 2020

(54) DISTRIBUTED CONNECTIVITY POLICY ENFORCEMENT WITH ICE

(71) Applicant: Microsoft Technology Licensing, LLC, Redmond, WA (US)

(72) Inventors: Rajesh Gunnalan, Sammamish, WA (US); Humayun Mukhtar Khan, Issaquah, WA (US); Abhinav Bose, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,729

(22) Filed: Dec. 17, 2018

(65) Prior Publication Data

US 2019/0124125 A1    Apr. 25, 2019

Related U.S. Application Data

(63) Continuation of application No. 14/923,004, filed on Oct. 26, 2015, now Pat. No. 10,205,755, which is a continuation of application No. 12/709,110, filed on Feb. 19, 2010, now Pat. No. 9,203,872.

(51) Int. Cl.
| | |
|---|---|
| *H04L 29/06* | (2006.01) |
| *H04L 12/911* | (2013.01) |
| *H04L 12/24* | (2006.01) |
| *H04L 29/12* | (2006.01) |

(52) U.S. Cl.
CPC ...... *H04L 65/1069* (2013.01); *H04L 41/0893* (2013.01); *H04L 47/726* (2013.01); *H04L 47/781* (2013.01); *H04L 47/828* (2013.01); *H04L 29/12528* (2013.01); *H04L 29/12566* (2013.01); *H04L 61/2575* (2013.01); *H04L 61/2589* (2013.01)

(58) Field of Classification Search
None
See application file for complete search history.

(56) References Cited

U.S. PATENT DOCUMENTS

| | | | |
|---|---|---|---|
| 7,451,488 B2 * | 11/2008 | Cooper | H04L 63/102 726/2 |
| 2004/0083382 A1 * | 4/2004 | Markham | H04L 63/102 726/1 |
| 2005/0010821 A1 * | 1/2005 | Cooper | H04L 63/102 726/4 |

(Continued)

*Primary Examiner* — Hong S Cho

(57) ABSTRACT

Instead of utilizing a centralized server or hardware(routers/gateways) to enforce connectivity policy restrictions, the policy connectivity restrictions for media session traffic are enforced by an endpoint that is involved in the media communication. Based on the policy requirements, the client enforces the policy restrictions by restricting the candidates that may be selected for the establishment of the media path. For example, the enforcement may result in the client selecting a path from available candidates that avoids congested Wide Area Network (WAN) links, avoiding a low bandwidth link, or possibly even failing the communication completely. The clients may also provide periodic updates to the policy server to allow tracking of the utilization of managed WAN links.

17 Claims, 4 Drawing Sheets

(56) References Cited

U.S. PATENT DOCUMENTS

| | | | |
|---|---|---|---|
| 2006/0074852 A1* | 4/2006 | Finkelstein | G06F 16/313 |
| 2007/0019625 A1* | 1/2007 | Ramachandran | H04L 12/6418 |
| | | | 370/352 |
| 2007/0076729 A1* | 4/2007 | Takeda | H04L 61/2564 |
| | | | 370/401 |
| 2007/0101414 A1* | 5/2007 | Wing | H04L 29/06027 |
| | | | 726/5 |
| 2009/0113067 A1* | 4/2009 | Andreasen | H04L 29/12528 |
| | | | 709/231 |
| 2010/0268763 A1* | 10/2010 | Rasanen | H04L 29/06027 |
| | | | 709/203 |
| 2012/0233656 A1* | 9/2012 | Rieschick | H04L 63/1441 |
| | | | 726/1 |
| 2015/0026761 A1* | 1/2015 | Raleigh | G06F 21/57 |
| | | | 726/1 |

* cited by examiner

DISTRIBUTED CONNECTIVITY POLICY ENFORCEMENT WITH ICE

CROSS-REFERENCE TO RELATED APPLICATIONS

This application is a continuation of U.S. patent application Ser. No. 14/923,004 (now U.S. Pat. No. 10,205,755), entitled "DISTRIBUTED CONNECTIVITY POLICY ENFORCEMENT WITH ICE," filed Oct. 26, 2015, which application is a continuation of, and claims priority to, non-provisional U.S. patent application Ser. No. 12/709,110 know U.S. Pat. No. 9,203,872), filed Feb. 19, 2010, the entire disclosures of which are hereby incorporated herein by reference.

BACKGROUND

Interactive Connectivity Establishment (ICE) is a protocol that is used for establishing connectivity for Voice Over IP (VOIP) sessions traversing net address translators (NATs) and firewalls. The ICE protocol focuses on establishing the most efficient path in terms of media latency. ICE is a general purpose connectivity protocol and the final path selected by ICE is based on priorities for the paths and is not deterministic. There are situations where additional policy enforcement functionality may be desired. For example, enterprises might want the media traffic of a group of employees to flow through a specific path. This could be to provide a secure and controlled media channel for sensitive communication, for monitoring and recording of media traffic, and the like. The most efficient path might utilize an expensive WAN which an enterprise might want to avoid to reduce cost. For such cases, an enterprise may not desire to establish media connectivity when the required constraints for the media paths cannot be met.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Policy restrictions that specify connection requirements for a media communication are enforced by an endpoint of the communication. The connection requirements may relate to specifying that media of a communication flow through a specific path, that the media flow avoid certain media paths, and the like. Instead of utilizing a centralized server or hardware(routers/gateways) to enforce connectivity policy restrictions, the policy connectivity restrictions for media session traffic are enforced by an endpoint that is involved in the media communication. Based on the policy requirements, the client enforces the policy restrictions by restricting the candidates that may be selected for the establishment of the media path. For example, the enforcement may result in the client selecting a path from available candidates that avoids congested Wide Area Network (WAN) links, avoiding a low bandwidth link, or possibly even failing the communication completely.

DETAILED DESCRIPTION

Figure 1:
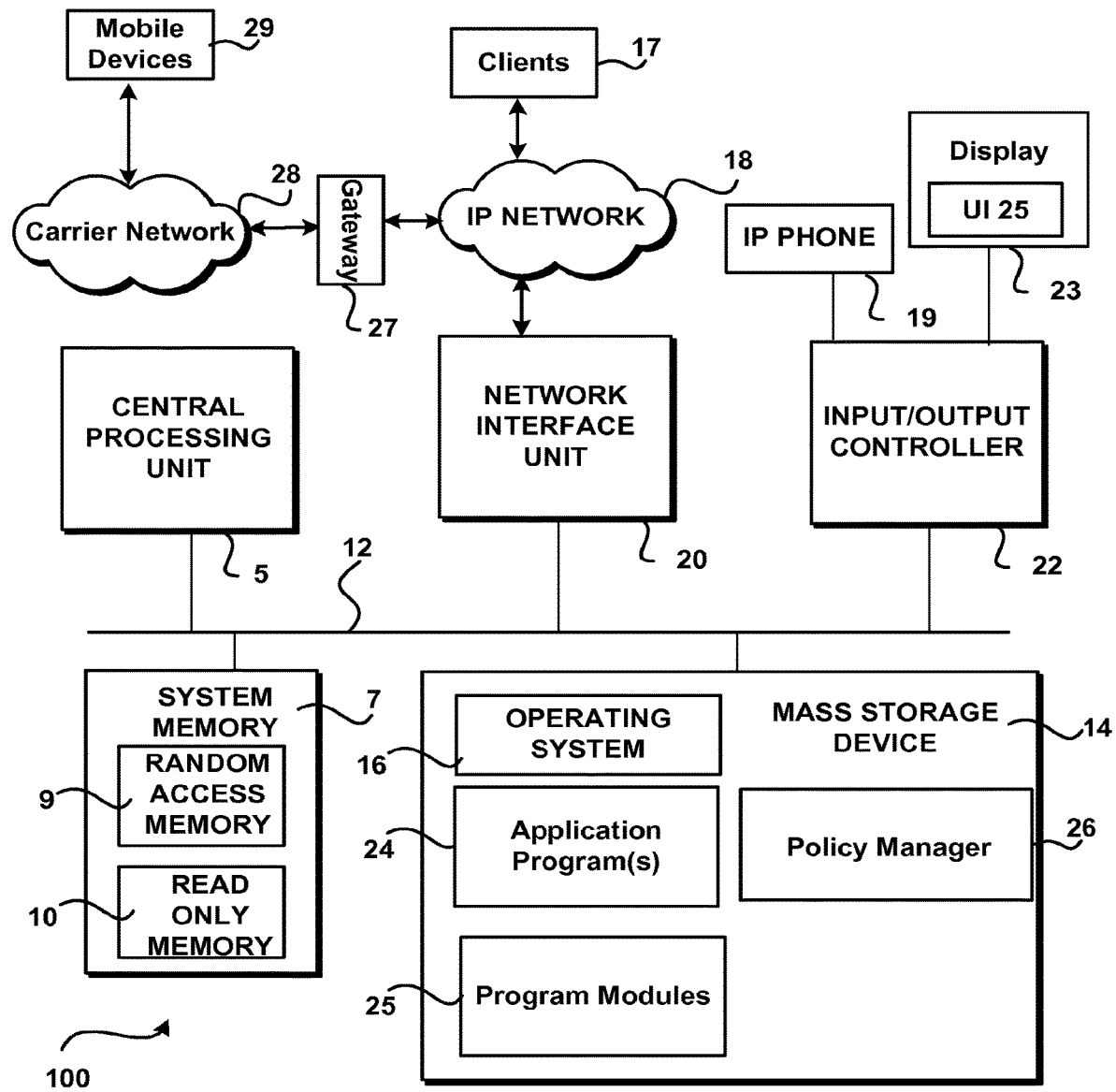
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 may be configured as a server, a client, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program (s) 24, other program modules 25, and policy manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EE- PROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone 19, a display screen 23, a printer, or other type of output device.

Carrier network 28 is a network responsible for communicating with mobile devices 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like.

Gateway 27 routes messages between carrier network 28 and IP Network 18. For example, a call or some other message may be routed to a mobile device on carrier network 28 and/or route a call or some other message to a user's device on IP network 18. Gateway 27 provides a means for transporting the communication from the IP network to the carrier network. Conversely, a user with a device connected to a carrier network may be directing a call to a client on IP network 18.

As mentioned briefly above, a number of program modules and data files may be stored in the mass storage device 14 and RAM 9 of the computer 100, including an operating system 16 suitable for controlling the operation of a computer, such as WINDOWS COMMUNICATION SERVER®, WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs 24 and program modules 25. User Interface 25 may be utilized to interact with one or more programs.

Policy manager 26 is configured to enforce policy decisions at a client level. According to one embodiment, policy manager 26 is deployed on one or more client devices within the communications network that are communication endpoints. The policy manager 26 determines the policy restrictions and uses the policy restrictions to select a media path that meets the policy restrictions. The policy restrictions may be determined different ways. For example, a policy server may be contacted, the policy restrictions may be stored on the client, and/or the policy manager may locate the policy restrictions on another computing or storage device. Based on the policy decision, policy manager 26 selects the IP candidates that meet the requirements specified by the policy. The enforcement may result in policy manager 26 removing one or more of the available IP candidates. For example, the policy restrictions may specify to avoid a certain path(s) based on bandwidth, cost, and the like. Policy manager 26 may also provide periodic updates to a media server to allow tracking and utilization of managed links.

According to one embodiment, policy manager 26 communicates with an application program 24 such as MICROSOFT's OFFICE COMMUNICATOR®. While policy manager 26 is illustrated as an independent program, the functionality may be integrated into other software and/or hardware, such as MICROSOFT's OFFICE COMMUNICATOR®. The operation of policy manager 26 is described in more detail below.

Figure 2:
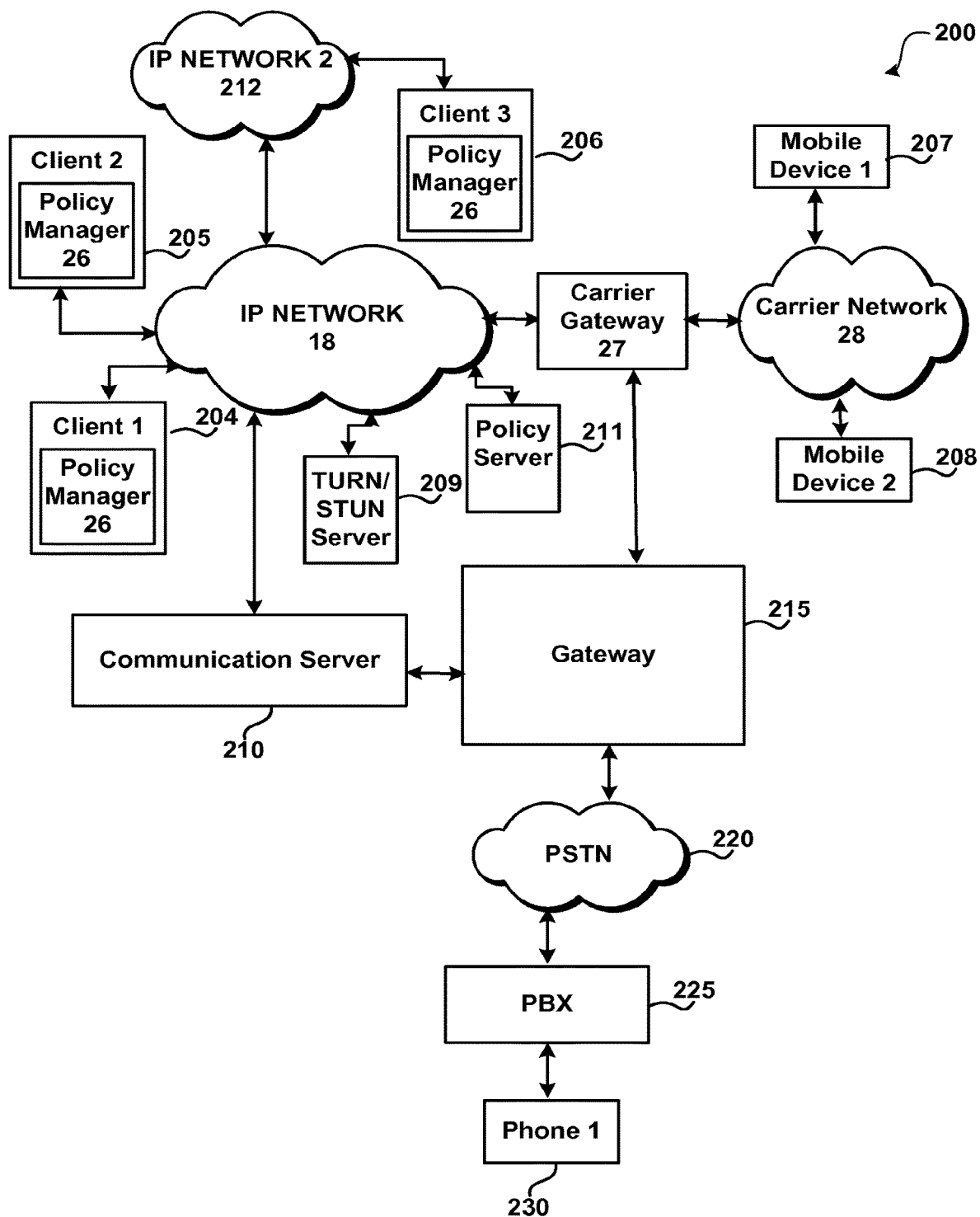
FIG. 2 shows a communications system for a VoIP communication system.

FIG. 2 shows a communications system for a VoIP communication system. As illustrated, system 200 includes client 1 (204) and client 2 (205) that are coupled to IP Network 18, client 3 (206) that is coupled to IP Network 2 (212), mobile device 1 (207) and mobile device 2 (208) that are coupled to carrier network 28, communication server 210, TURN/STUN server 209, and policy server 211 that are coupled to IP network 18, carrier gateway 27, gateway 215 coupled to PBX 225 through PSTN 220 and phone 1 (230). As illustrated, each of the clients includes a policy manager 26 that is used in enforcing policy restrictions. More or fewer client devices may include policy manager 26. As briefly discussed above, policy manager 26 is configured to enforce policy decisions for the media flow of a communication at the client level instead of requiring a dedicated hardware solution.

The communications server 210 is configured to route incoming calls to the appropriate destinations. Routing communication within system 200 may be done different ways. For example, a telephone number may be mapped to a Session Initiation Protocol (SIP) Uniform Resource Indicator (URI) using a Reverse Number Lookup (RNL) process. By performing reverse number lookup, the server 210 can route calls to endpoints associated with a particular user's SIP Uniform Resource Identifier (URI). The server may also utilize call authorization rules configured by an administrator to route each call to the appropriate media gateway (i.e. carrier gateway 27, gateway 215). According to one embodiment, communications server 210 utilizes SIP. For more information on this industry standard protocol see IETF RFC 3261 which may be found at http://www.ietf.org/rfc/rfc3261.txt. Generally, SIP defines a standard for session setup, termination, and media negotiation between two parties that is widely used for Voice-over-IP (VoIP) call signaling. The Session Description Protocol (SDP), or some other protocol, may also be utilized by the system to define how multimedia sessions can be organized as to allow the endpoints of the conversation to participate.

The communication server 210 routes calls to endpoints on the IP network (IP-IP calls); routes calls to the public switched telephone network (PSTN)/PBX (IP-PSTN calls) and may also route calls to destinations using other networks, such as a carrier network. The communication server may be coupled to the networks through one or more gateways. A gateway 215 translates signaling and media between the network and the IP voice infrastructure.

Communications server 210 may be configured to provide communication services for one or more locations. For example, communications server 210 may be utilized for a business having branch offices that are connected using IP Network 18 and/or other IP networks (e.g. IP Network 2 (212)). For example, Client 3 may be located at a branch office while communication server 210 is located at the main office.

Clients may use the Interactive Connectivity Establishment (ICE) protocol for Network Address Translator (NAT) traversal for multimedia session signaling protocols based on the offer/answer model, such as the Session Initiation Protocol (SIP). ICE uses the Simple Traversal of UDP through NAT (STUN) protocol in peer-to-peer cooperative fashion, allowing participants to discover, create and verify mutual connectivity A media server, such as TURN/STUN server 209, may be used to determine the IP candidates to use for establishing a communication flow for a client. Generally, STUN is a network protocol allowing a client behind a NAT (Network Address Translator) to find out its public address, the type of NAT it is behind and the internet-side port associated by the NAT with a particular local port. Generally, Traversal Using Relay NAT (TURN) is a protocol that allows for an element behind a NAT or firewall to receive incoming data over TCP or UDP connections.

Using TURN/STUN server 209, a client, such as client 1, gathers all of its candidates (its external IP addresses) when it is located behind a NAT. For purposes of the discussion, assume that client 1 is a caller that decides to call client 2 (callee). The caller discovers all of the IP addresses that may be utilized for the conversation by requesting the candidates from TURN/STUN server 209. For example, there may one, two, three, or more candidates. The discovered candidates are incorporated into the offer to the callee (client 2). On the callee side, client 2 gathers all of its candidates using TURN/STUN server 209. Policy manager 26 on the callee determines the policy restrictions for the communication and determines the candidates that are not restricted based on the policy restrictions. The policy restrictions may relate to one or more policy restrictions, such as bandwidth, call control, quality level, monitoring, intercept, and the like. The policy restrictions may be stored on one or more devices. For example, policy server 211 may store the policy restrictions, the client may store the policy restrictions, or some other storage device may store the policy restrictions.

According to one embodiment, both of the endpoints for the communication (in this example client 1 and client 2) implement the ICE protocol as defined in MS-ICE2. As discussed, the callee endpoint (client 2) on receiving the invite offer from the caller endpoint (client 1) is aware of the caller's candidates. The callee endpoint at this point could either have been pre-configured with the connectivity policy or can communicate with a policy server, such as policy server 211, to determine the connectivity policy. The connectivity policy decision may require that some of the potential network paths using the caller's and callee's candidates to be avoided or even to completely fail the establishment of communication between the two endpoints. When the callee (client 2) enforces the policy restraints, the callee removes candidates that are restricted by the policy and sends the non-restricted candidates back to the caller. During the ICE connectivity checks between the caller and the callee, the callee checks to determine that the caller does not use any of the restricted candidates. Since the caller endpoint is not aware of the policy decision, the callee endpoint is responsible for enforcing the policy decisions and ensuring the that restricted media paths are not used for media flow. Using policy manager 26, the callee endpoint upon receiving a connectivity check packet checks to see if the local candidate or remote candidate for the connectivity check packet is restricted by policy checks. According to one embodiment, the remote candidate from which the connectivity check packet is received is identified using a candidate-identifier attribute. The CANDIDATE-IDENTIFIER allows the endpoint receiving the STUN binding request packet to differentiate between candidates and uniquely identify the candidate even when multiple candidates are behind the same NAT.

According to one embodiment, two additional error codes are utilized for handling connectivity checks for a restricted candidate, including an ICE_ERRCODE_DISABLE_CANDIDATE error code and an ICE_ERRCODE_DISABLE_CANDIDATE_PAIR. On the callee endpoint receiving a STUN binding request connectivity check packet, If the local candidate is restricted a STUN binding error response is sent out with ICE_ERRCODE_DISABLE_CANDIDATE_PAIR. If the remote candidate is restricted then the a STUN binding response with ICE_ERRCODE_DISABLE_CANDIDATE is sent out. The caller endpoint on receiving the STUN binding error message with ICE_ERRCODE_DISABLE_CANDIDATE_PAIR disables the candidate pair for which the error response is sent, if it receives ICE_ERRCODE_DISABLE_CANDIDATE the peer disables all candidate pairs associated with the local candidate for which the error response was received. This mechanism is directed at reducing the connectivity check retry attempts for candidate pairs with restricted candidates. For situations where the peer is not an ICE policy enforcement capable endpoint, the ICE policy enforcement capable endpoint take on the role of the callee endpoint specified above. This is useful for scenarios where the peer is a Gateway that is not aware of ICE or policy enforcement. Policy management may be done by the endpoint that has information about the peer's ip address. In most situations, the callee has this information. The remote candidate information is then sent to the policy server during the allocation of candidates on the callee. The policy server determines the location/policy settings of the caller and callee based on the allocate requests that are embedded with the policy attributes.

In the situation where the TURN/STUN server 209 is an ICE endpoint and the peer is a UDP endpoint, the IP address are known to the TURN/STUN server since the TURN/STUN server knows the peer's candidate, the policy management can be done by the TURN/STUN server(caller in this scenario) even before sending out the invite. This scenario also applies to other cases where the caller is ICE and the callee is a UDP endpoint and peer's IP address is know before sending out the invite. The TURN/STUN server before sending the invite, configures the media stack with the IP address and enables bandwidth management. The media stack on the TURN/STUN server sends the remote candidate information to the policy server and gets the policy decision during its allocation phase.

In the scenario where the TURN/STUN server is an ICE endpoint and the peer is a non-ICE UDP endpoint, the policy management can be done by the TURN/STUN server independent of whether the TURN/STUN server is in a spread or concentrated topology since the peer's IP address are known from the invite. This scenario applies to other cases where the callee is ICE endpoint and the caller is a non-ICE endpoint. The TURN/STUN server on the receiving the invite demotes the ICE endpoint to an UDP endpoint since no connectivity checks are needed. When the TURN/STUN server receives a invite from a non-ICE endpoint, the media stack on the TURN/STUN server sends the peer's candidate to the policy server during its allocation phase and performs bandwidth checks. If the bandwidth checks fail between for the path between TURN/STUN server and the gateway then the call fails.

Figure 3:
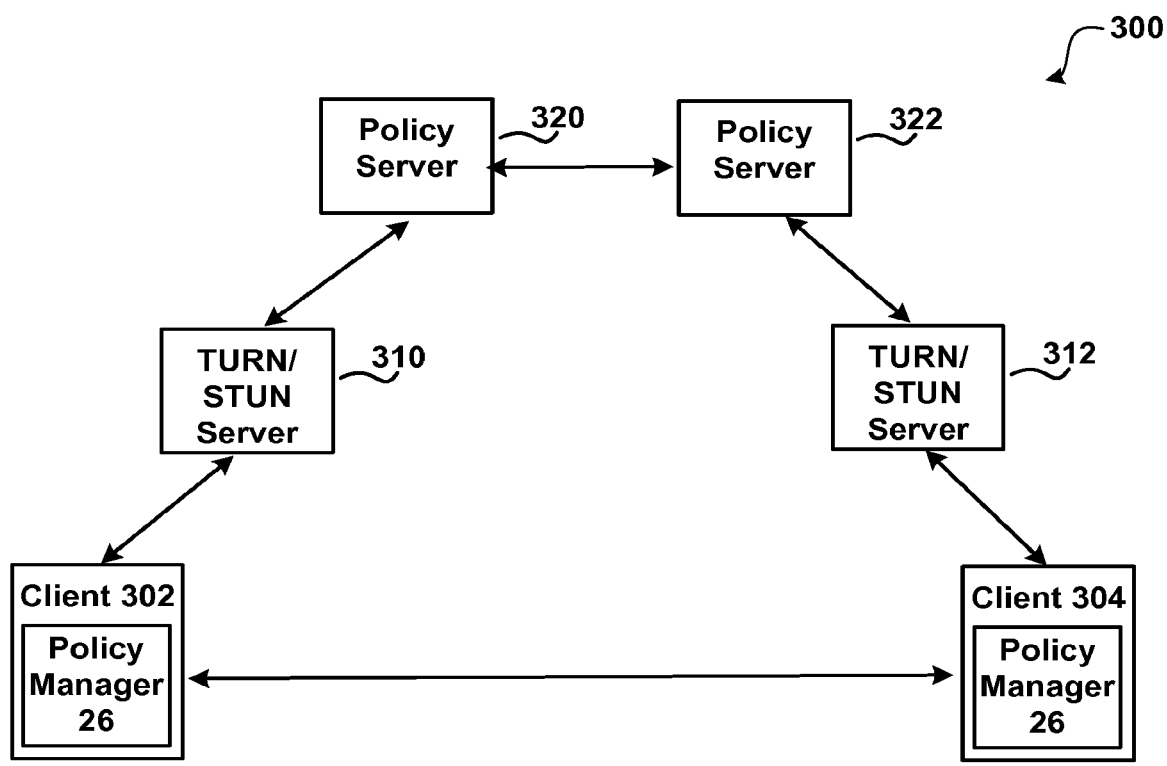
FIG. 3 shows a high level overview of the interactions and entities involved in enforcing policy restrictions between two endpoints of a communication.

FIG. 3 shows a high level overview of the interactions and entities involved in enforcing policy restrictions between two endpoints of a communication. As illustrated, system 300 comprises client 302, client 304, TURN/STUN server 310, TURN/STUN server 312, policy server 320 and policy server 322.

Initially, client 302 sends an allocate request (AR) with a bandwidth (BW) request to a media relay server, such as TURN/STUN server 310. In response to the request, the TURN/STUN server provides client 302 with a list of the local and remote candidates. Client 302 then makes an offer with ICE to client 304. After receiving the offer, client 304 makes an allocation request with BW requested including the local and remote candidates. TURN/STUN server 312 returns an allocate response with BW allocated for the local and remote candidates as indicated by the decision of policy server 322. Generally, the policy servers obtain the policy information from a repository and provides the decisions back to the clients. Client 304 then determines the candidates that do not meet the requirements as determined by policy manager 26. The candidates that do not meet the quality requirements are removed before client 304 sends the answer with ICE back to client 302. In response to the answer, client 302 re-invites with ICE to client 304. A periodic keep alive may also be sent from a client, such as client 304 to TURN/STUN server 312 that contains the candidate used and the raw send and received BW's.

Figure 4:
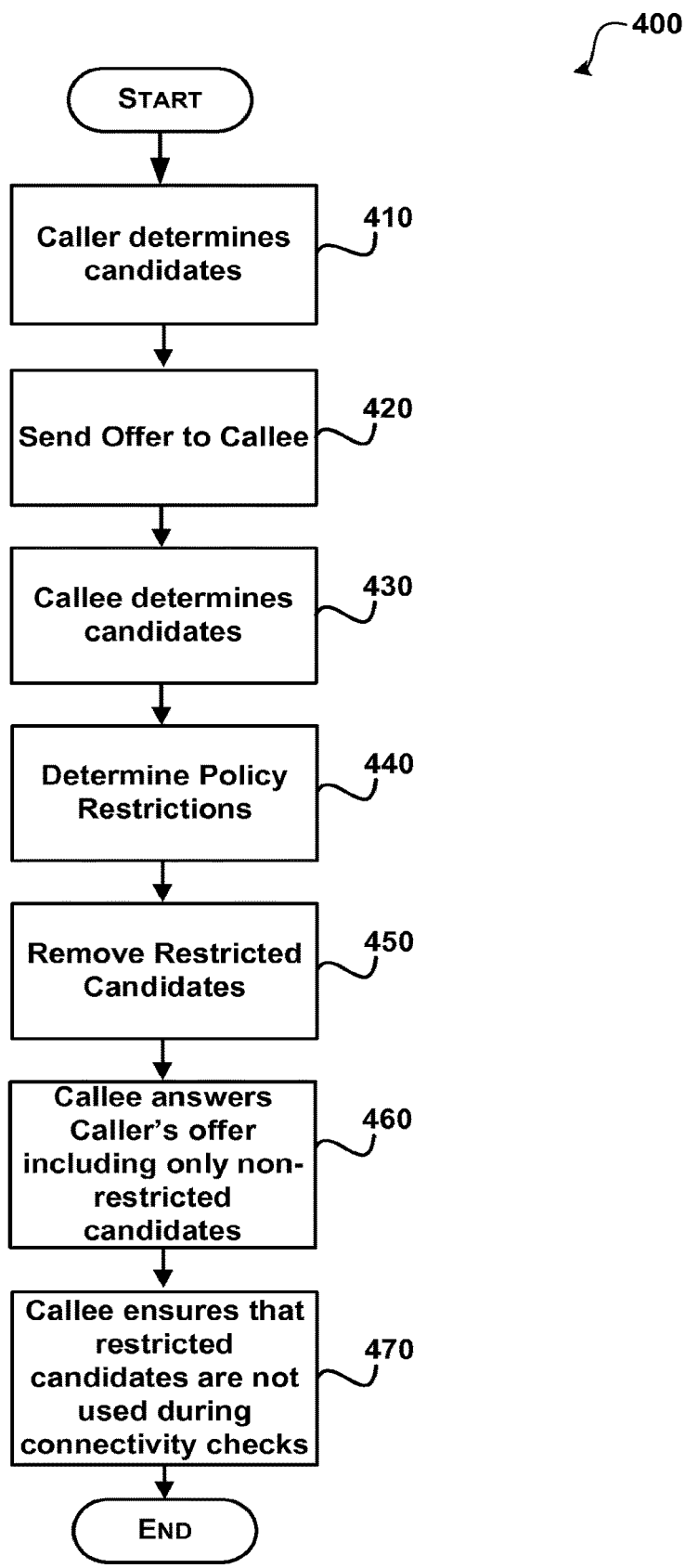
FIG. 4 shows an illustrative process for enforcing policy restrictions.

Referring now to FIG. 4, an illustrative process for enforcing policy restrictions will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, the process flows to operation 410, where the caller determines its candidates that may be used in establishing a communication. According to one embodiment, the caller uses a TURN/STUN server to determine the candidates that may be utilized.

Moving to operation 420, an offer including the determined candidates is sent to the callee from the caller.

Flowing to operation 430, the callee determines its candidates that may be used to establish a communication. As discussed, a TURN/STUN server may be used to determine the candidates.

Transitioning to operation 440, the callee determines the policy restrictions that apply to the communication. The policy restrictions may be already known by the callee and/or the callee may access the policy restrictions on another computing device. For example, the callee may request the policy restrictions from a policy server.

Moving to operation 450, the candidates that do not meet the policy restrictions are removed from the determined candidates. A candidate may be removed for many different reasons. For example, the candidate may require an expensive connection that is restricted by the policy, the candidate may result in too slow of a connection as specified by the policy, and the like.

Flowing to operation 460, the callee answers the offer from the caller and includes the candidates that have not been removed from the callee within the answer.

Moving to operation 470, during connectivity checks between the caller and the callee, the callee ensures that none of the candidates that were removed by the callee are used. The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for enforcing policy restrictions for a conversation established over an Internet Protocol (IP) network, comprising:
   generating a plurality of candidate IP addresses for use in connecting a first client with a second client;
   providing the plurality of candidate IP addresses to at least the first client;
   receiving, from the second client, a subset of candidate IP addresses, wherein the subset of candidate IP addresses is generated by removing at least one of the plurality of candidate IP addresses based on a policy restriction, wherein the policy restriction specifies a restriction on a media flow for a communication between the first client and the second client, and wherein the at least one removed candidate IP address is not utilized during connectivity checks between the first client and the second client; and
   establishing a connection between the first client and the second client using one of the subset of candidate IP addresses.

2. The method of claim 1, wherein the policy restriction is specified by a policy server.

3. The method of claim 1, further comprising:
   providing the plurality of candidate IP addresses to the first client for performing connectivity checks.

4. The method of claim 1, wherein the first client determines caller IP addresses and wherein the second client determines callee IP addresses.

5. The method of claim 1, wherein the first client provides the plurality of candidate IP addresses to the second client.

6. The method of claim 1, wherein the second client provides the subset of candidate IP addresses to the first client.

7. The method of claim 1, wherein providing the plurality of candidate IP addresses for use in connecting the first client with the second client is performed using an Interactive Connectivity Establishment (ICE) connectivity check.

8. A computer system comprising a processor in communication with a computer-readable storage media, the computer-readable storage media storing instructions that, when executed by the processor cause the computer system to:
   generate a plurality of candidate IP addresses for use in connecting a first client with a second client;
   provide the plurality of candidate IP addresses to at least the first client;
   receive, from the second client, a subset of candidate IP addresses, wherein the subset of candidate IP addresses is generated by removing at least one of the plurality of candidate IP addresses based on a policy restriction, wherein the policy restriction specifies a restriction on a media flow for a communication between the first client and the second client, and wherein the at least one removed candidate IP address is not utilized during connectivity checks between the first client and the second client; and establish a connection between the first client and the second client using one of the subset of candidate IP addresses.

9. The computer system of claim 8, wherein the policy restriction is specified by a policy server.

10. The computer system of claim 8, the instructions further causing the computer system to:

provide the subset of candidate IP addresses to at least the first client.

11. The computer system of claim 8, wherein the second client provides the subset of candidate IP address to the first client.

12. The computer system of claim 8, wherein the first client provides the plurality of candidate IP addresses to the second client.

13. The computer system of claim 8, wherein providing the plurality of candidate IP addresses for use in connecting the first client with the second client is performed using an Interactive Connectivity Establishment (ICE) connectivity check.

14. A computer-readable storage device storing instructions that, when executed by a processor, are capable of performing a method, the method comprising:

generating a plurality of candidate IP addresses for use in connecting a first client with a second client;

providing the plurality of candidate IP addresses to at least the first client;

receiving, from the second client, a subset of candidate IP addresses, wherein the subset of candidate IP addresses is generated by removing at least one of the plurality of candidate IP addresses based on a policy restriction, wherein the policy restriction specifies a restriction on a media flow for a communication between the first client and the second client, and wherein the at least one removed candidate IP address is not utilized during connectivity checks between the first client and the second client;

providing the subset of candidate IP addresses to at least the first client; and establishing a connection between the first client and the second client using one of the subset of candidate IP addresses.

15. The computer-readable storage device of claim 14, wherein the policy restriction is specified by a policy server.

16. The computer-readable storage device of claim 14, further comprising:

providing the plurality of candidate IP addresses to the first client for performing connectivity checks.

17. The computer-readable storage device of claim 14, wherein the second client is the callee and the first client is the caller for the connection.

* * * * *